(12) United States Patent
Tanaka

(10) Patent No.: US 9,160,821 B2
(45) Date of Patent: Oct. 13, 2015

(54) COMMUNICATION DEVICE AND METHOD

(75) Inventor: Jun Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 735 days.

(21) Appl. No.: 12/855,225

(22) Filed: Aug. 12, 2010

(65) Prior Publication Data

US 2011/0051750 A1  Mar. 3, 2011

(30) Foreign Application Priority Data

Aug. 25, 2009  (JP) ................................. 2009-194423

(51) Int. Cl.
*H04J 3/00* (2006.01)
*H04L 29/06* (2006.01)
*H04L 12/709* (2013.01)

(52) U.S. Cl.
CPC .............. *H04L 69/14* (2013.01); *H04L 45/245* (2013.01); *Y02B 60/33* (2013.01)

(58) Field of Classification Search
CPC ....... H04L 69/14; H04L 45/245; Y02B 60/33
USPC .............. 370/394, 349, 389, 392, 395.1, 428
See application file for complete search history.

(56) References Cited

U.S. PATENT DOCUMENTS

| | | | |
|---|---|---|---|
| 6,542,504 B1 * | 4/2003 | Mahler et al. .................. 370/392 | |
| 6,721,271 B1 | 4/2004 | Beshai et al. | |
| 6,771,653 B1 * | 8/2004 | Le Pennec et al. ........... 370/412 | |
| 6,970,921 B1 * | 11/2005 | Wang et al. .................... 709/220 | |
| 7,054,986 B2 * | 5/2006 | Zhao et al. ..................... 710/310 | |
| 2002/0122424 A1 * | 9/2002 | Kawarai et al. ............... 370/394 | |
| 2004/0076161 A1 * | 4/2004 | Lavian et al. ............. 370/395.41 | |
| 2004/0258070 A1 * | 12/2004 | Arima ......................... 370/395.4 | |
| 2004/0264396 A1 * | 12/2004 | Ginzburg et al. ............. 370/311 | |
| 2005/0190697 A1 | 9/2005 | Dohi et al. | |
| 2006/0203826 A1 * | 9/2006 | Cho et al. ................. 370/395.53 | |

FOREIGN PATENT DOCUMENTS

JP   2000-261506 A   9/2000
JP   2005-252333 A   9/2005

* cited by examiner

*Primary Examiner* — Luat Phung
(74) *Attorney, Agent, or Firm* — Fujitsu Patent Center

(57) ABSTRACT

There is provided a communication device performing communication by breaking up a frame into a plurality of links, the communication device includes a dividing means for dividing the frame into units of a predetermined size, a distributing means for distributing the units to a plurality of links, a plurality of storing means for storing the units distributed by the distributed means in payloads of transfer frames for the respective plurality of links, a timer means for measuring a timeout time based on a priority of the frame, and a transmission means for transmitting the transfer frames to another communication device via the plurality of links in one of a case where the units included in the payloads of the transfer frames becomes to a predetermined amount and a case where the timeout time measured by the timer becomes to a predetermined value.

14 Claims, 15 Drawing Sheets

FIG. 5

| PRIORITY | TIMEOUT VALUE |
|---|---|
| 1 | t1 |
| 2 | t2 |
| ... | ... |
| 8 | t8 |

COMMUNICATION DEVICE AND METHOD

CROSS-REFERENCE TO RELATED APPLICATION

This application is based upon and claims the benefit of priority of the prior Japanese Patent Application No. 2009-194423, filed on Aug. 25, 2009, the entire contents of which are incorporated herein by reference.

FIELD

The embodiments discussed herein are related to a communication device which performs communication by breaking up a frame into a plurality of links.

BACKGROUND

A technology for expanding a communication bandwidth is known as a link aggregation system (link aggregation). According to the link aggregation, an Ethernet (registered trademark) frame is broken up onto a plurality of physical links so as to be transmitted. The link aggregation was standardized by IEEE 802.3ad, and is defined by Chapter 43 of IEEE 802.3-2005 at present.

FIG. 12 illustrates a changed order of frames in a link aggregation system. Communication devices 101, 102 illustrated in FIG. 12 are connected to each other via links 103, 104. Square symbols including numerals illustrated in FIG. 12 indicate frames transmitted and received between the communication devices 101, 102. The numerals in the square symbols indicate the order of the frames.

The link aggregation includes an algorithm for distributing frames to the plural links 103, 104 on the basis of, e.g., a MAC (Media Access Control) address, an IP (Internet Protocol) address, a VLAN ID (Virtual Local Area Network IDentifier). If frames to be transmitted are simply distributed to the links 103, 104 alternately, the order of the frames may possibly be changed on the receiving side in some cases. Thus, Ethernet basically requires that the order of frames be not allowed to change.

Assume, e.g., that link lengths of the links 103, 104 are different from each other as illustrated in FIG. 12. In this case, the communication device 101 receives frames in an order of 1, 2, 3, 4, 5, and distributes the frames to the links 103, 104 alternately to transmit the frames. The communication device 102 receives the frames in an order of 2, 1, 4, 3, 5, though.

Thus, the MAC address, the IP address, the VLAN ID, etc. are made keys according to the link aggregation, so that the order of the frames is prevented from being changed at least in a same unit of communication (called a conversation). That is, frames of a same source address and a same destination address are distributed to the links as the conversation, so that the order of the frames is prevented from being changed between the frames belonging to the same conversation.

FIG. 13 is a diagram for explaining a conversation. Communication devices 111, 112 are connected to each other via links 113, 114. Terminals 115a, 115b communicate with each other via the communication devices 111, 112. Terminals 116a, 116b communicate with each other via the communication devices 111, 112. Square symbols including numerals illustrated in FIG. 13 indicate frames transmitted and received between the terminals 115a, 115b. Triangular symbols including numerals indicate frames transmitted and received between the terminals 116a, 116b. The numerals in the square and triangular symbols indicate the order of the frames.

The communication device 111 outputs the frames received from the terminals 115a and 116a to the links 113 and 114, respectively, on the basis of the MAC address, etc. The communication device 112 outputs the frames received from the links 113 and 114 to the terminals 115b and 116b, respectively, on the basis of the MAC address, etc. Thus, as illustrated in FIG. 13 by the square and triangular symbols including the numerals, the orders of the frames are maintained for the conversations on the terminals 115a, 115b and on the terminals 116a, 116b.

According to the link aggregation, even if frames are transmitted via p-links, the communication bandwidth is not necessarily multiplied by n, e.g., in a case where volumes of traffic are large and very small on one link and on another link, respectively.

FIG. 14 illustrates an imbalance in the communication bandwidth. Each of portions illustrated in FIG. 14 which is a same as the corresponding one illustrated in FIG. 13 is given a same reference numeral, and its explanation is omitted. Assume, as illustrated in FIG. 14, that the volume of the traffic between the terminals 115a, 115b is larger than that between the terminals 116a, 116b. Even if the communication is carried out via the two links 113, 114 in this case, the communication bandwidth is not twice as broad as that in one-link case.

Thus, it is known to divide a plurality of frames of variable lengths into units of a specific size, and to distribute the units to respective ports aggregated as one broadband port so as to transmit the units, e.g., as disclosed in Japanese Laid-open Patent Publication No. 2005-252333. According to the above, the traffic is equally broken up to the plural ports having been aggregated, so that the communication bandwidth may be effectively used.

If units into which a frame is divided are put into a capsule on a transfer frame such as an Ethernet frame so as to be transmitted, there is a trade-off relation between transfer efficiency and a delay of the transfer frame.

FIG. 15 illustrates an exemplary frame format of an Ethernet frame. As illustrated in FIG. 15, the Ethernet frame has a header including a destination address, a source address and an Ethernet type. Further, the Ethernet frame has a payload and an FCS (Frame Check Sequence). The Ethernet frame and the previous frame have to be provided with an inter-frame gap of at least 20 bytes between those frames.

The maximum frame length of an Ethernet frame excluding the inter-frame gap is 1518 bytes. If units are included in the payload up to the 1500 byte maximum, transfer efficiency for transferring the units on the Ethernet frame including the inter-frame gap is 1500/1538=97.5 percent. Meanwhile, if units of only 100 bytes are included in the payload and transmitted, the transfer efficiency is 100/138=72.5 percent. That is, if the number of units included in the payload is small, the transfer efficiency decreases.

Thus, if units are included in the payload up to the 1500 byte maximum, then provided with an FCS and transmitted, the transfer efficiency of the Ethernet frame increases. As, however, the Ethernet frame is not transmitted until the units are included in the payload up to 1500 bytes, the frame transmission delays in case of no units to be transmitted.

As described above, if a frame divided into units is put into a capsule on a transfer frame such as an Ethernet frame so as to be transmitted, there is a trade-off relation between transfer efficiency and a frame delay of the transfer frame.

By the way, the frame indicates a unit of data transferred in the Data Link Layer (the Layer 2) of OSI reference model.

SUMMARY

According to an aspect of the embodiment, there is provided a communication device performing communication by breaking up a frame into a plurality of links, the communication device includes a dividing means for dividing the frame into units of a predetermined size, a distributing means for distributing the units to a plurality of links, a plurality of storing means for storing the units distributed by the distributed means in payloads of transfer frames for the respective plurality of links, a timer means for measuring a timeout time based on a priority of the frame, and a transmission means for transmitting the transfer frames to another communication device via the plurality of links in one of a case where the units included in the payloads of the transfer frames becomes to a predetermined amount and a case where the timeout time measured by the timer becomes to a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an exemplary data structure of a timeout table;

DESCRIPTION OF EMBODIMENTS

First Embodiment

A first embodiment will be explained in detail with reference to the drawings as follows.

Figure 1:
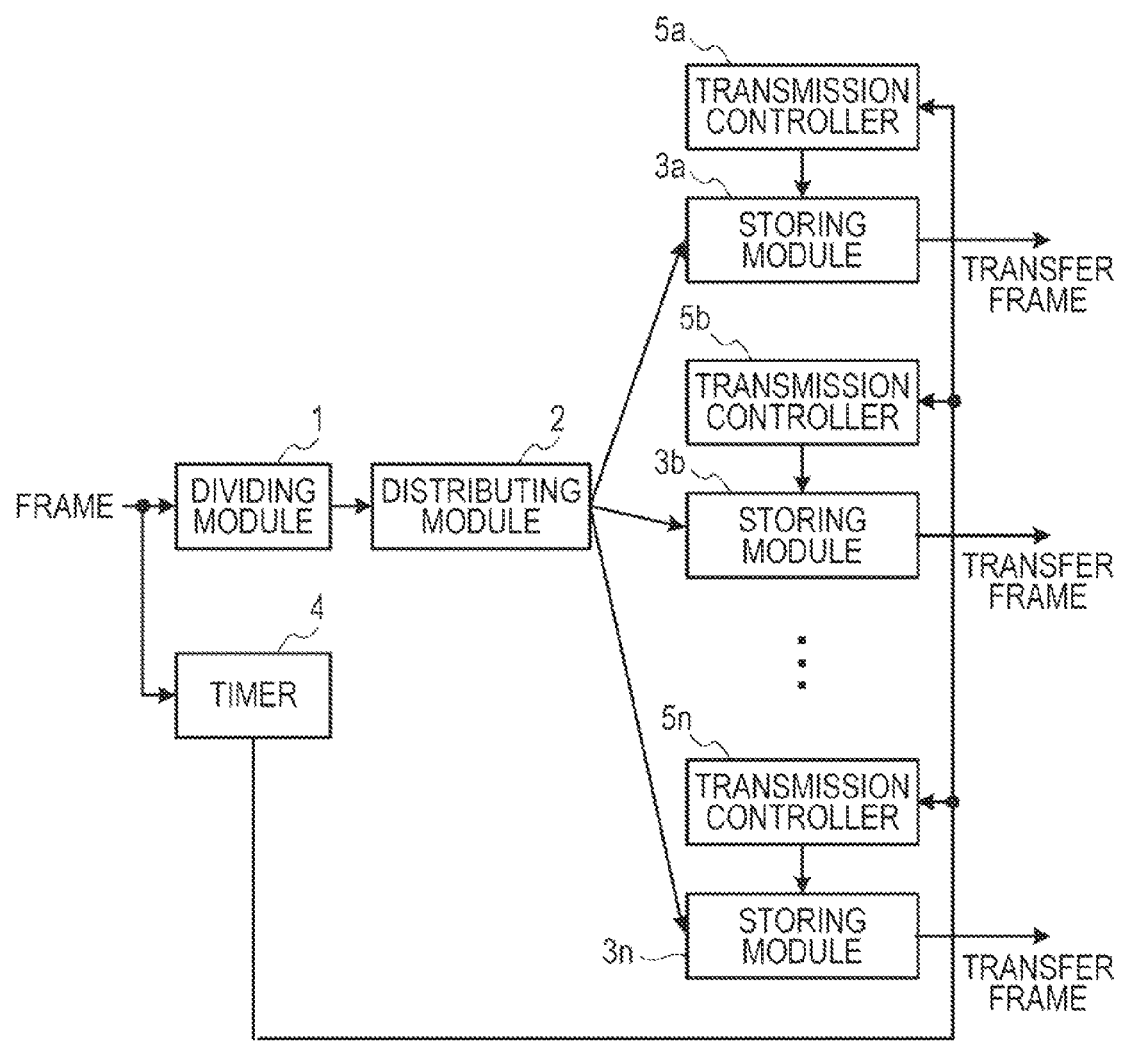
FIG. 1 illustrates a communication device of a first embodiment.

FIG. 1 illustrates a communication device of the first embodiment. As illustrated in FIG. 1, the communication device has a dividing module 1, a distributing module 2, storing modules 3a-3n, a timer 4 and transmission controllers 5a-5n.

The dividing module 1 divides a frame to be transmitted to another communication device into units of a specific size.

The distributing module 2 distributes the units divided by the dividing module 1 to a plurality of links. The storing modules 3a-3n are provided for the respective plural links, e.g., and the distributing module 2 distributes the units to the storing modules 3a, 3b, . . . , 3n, 3a, 3b, . . . in turn. The storing modules 3a-3n store the units distributed by the distributing module 2 in payloads of transfer frames for the respective plural links. The timer 4 measures a timeout time based on a priority of the frame. As an allowable frame delay of a high priority frame is smaller than that of a low priority frame, e.g., the timeout time measured for the high priority frame is short. The timeout time measured for the low priority frame is long as long as the frame delay is allowed. The transmission controllers 5a-5n transmit the transfer frames loaded with the payloads in which the units are included to another communication device via the plural links, upon the units included in the payloads of the transfer frames reaching a specific size, or upon the timeout time measured by the timer 4 having passed.

As described above, the timer 4 measures a longer timeout time in case of a low priority frame than in case of a high priority. More units of the low priority frame may thereby be included in the payloads of the transfer frames. Meanwhile, although fewer units of the high priority frame may be included in the payloads of the transfer frames, delays of the transfer frames may be prevented.

As described above, the communication device divides a frame into units of a specific size, and distributes the units to a plurality of links. The communication device then includes the units in payloads of transfer frames to be transmitted to another communication device. The communication device transfers the transfer frames to another communication device, upon the units included in the payloads of the transfer frames reaching a specific size, or upon a timeout time based on the priority of the frame having passed. Transfer efficiency of the transfer frames may thereby be properly enhanced, and the delay of the transfer frames may be properly prevented.

Second Embodiment

Then, a second embodiment will be explained in detail with reference to the drawings.

Figure 2:
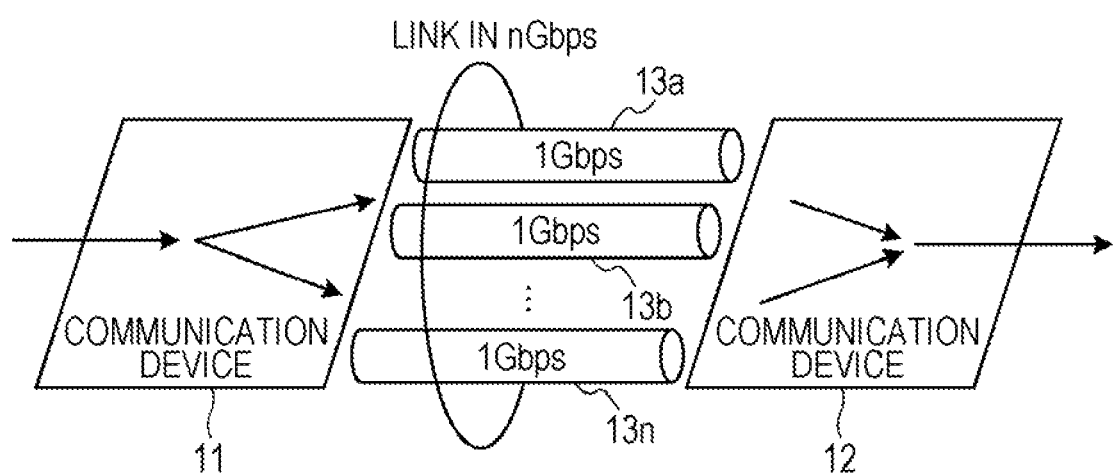
FIG. 2 illustrates a communication network which uses a communication device of a second embodiment.

FIG. 2 illustrates a communication network using a communication device of the second embodiment. FIG. 2 illustrates, e.g., a communication device 11 which receives a frame from a terminal or a communication device which is not illustrated and transmits the frame to a communication device 12, and the communication device 12 which receives the frame from the communication device 11 and transmits the frame to a terminal or a communication device which is not illustrated. The communication devices 11, 12 are, e.g., L2 (Layer 2) or L3 switches.

The communication devices 11, 12 are connected via n-links 13a-13n and perform communication by applying link aggregation. The communication devices 11, 12 work the n-links 13a-13n as one link, and transmit a frame being distributed to the n-links 13a-13n so as to enhance a communication bandwidth. Further, as the communication devices 11, 12 of the communication system illustrated in FIG. 2 are connected via the n-links 13a-13n, even if m-links (m<n) of the links 13a-13n are down and turns unusable for the communication, the communication devices 11, 12 may continue the communication by using the remaining ones of the links 13a-13n. It is supposed that the communication device 11 transmits a frame to the communication device 12 as described above, and it may be supposed that the communication device 12 transmits a frame to the communication device 11.

The communication device 11 has link processors corresponding to the links 13a-13n. The communication device 11 divides a frame received from a terminal or a communication device into units of a specific size, and distributes the units to the link processors corresponding to the links 13a-13n in turn. The link processors include the distributed units in payloads of link transfer frames, and transmit the link transfer frames to the links 13a-13n upon the size of the units of the payloads reaching a specific size, or upon a timeout time having passed. The communication device 11 measures the timeout time, e.g., on the basis of a QoS (Quality of Service) of the received frame. The QoS indicates how a communication service or application being performed should process an IP packet or an Ethernet frame in the network, and may be called a priority. A service which requires communication on a real-time basis such as VoIP (Voice over IP), e.g., requires a short delay as the communication is disabled in case of a long delay. A transaction of a financial service, then, requires quickness of response (short delay in the network) and a smallest packet discard in spite of a not so large amount of traffic. Meanwhile, the delay or packet discard is regarded not much important for Web browsing, etc. Thus, a transaction of the financial service or VoIP is assigned a high priority, and communication such as Web browsing is assigned a low priority in general.

Thus, upon receiving a frame of a low priority, the communication device 11 sets the timeout time long so that lots of units are included in the payloads of the link transfer frames, and that transfer efficiency of the units of the link transfer frames may be enhanced. Meanwhile, upon receiving a frame of a high priority, the communication device 11 sets the timeout time short so as to prevent a frame delay.

Figure 3:
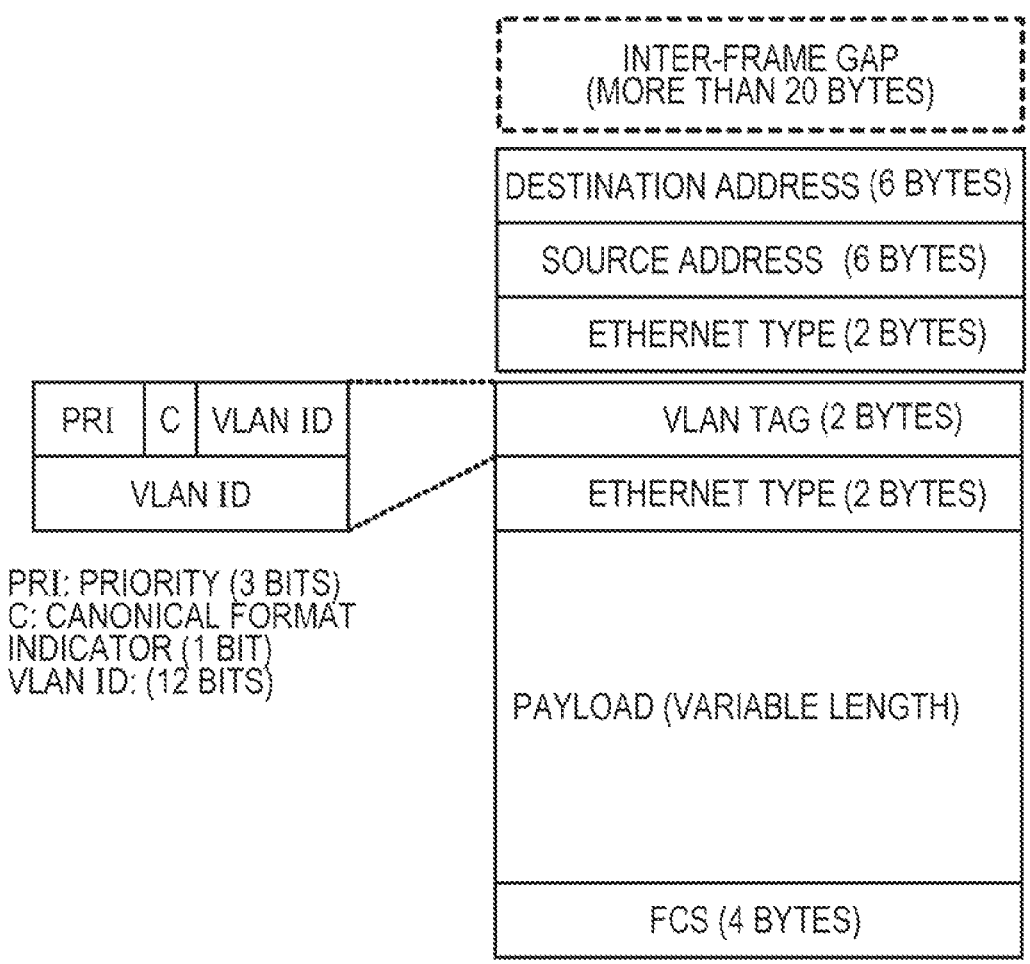
FIG. 3 illustrates an exemplary frame format of an Ethernet frame.

FIG. 3 illustrates an exemplary frame format of an Ethernet frame. As illustrated in FIG. 3, the Ethernet frame has a header including a destination address, a source address, an Ethernet type and a VLAN tag. Further, the Ethernet frame has a payload and an FCS. As illustrated in FIG. 3, the VLAN tag has PRI (Priority), C (Canonical format indicator) and VLAN ID fields. The priority of the Ethernet frame may be specified by the PRI of the VLAN tag. As the PRI is a three bit field, up to eight priorities may be specified. Incidentally, an IP packet has a field called ToS (Type of Service) which is used for specifying the priority and the QoS of the packet. The communication device 11 may thereby set the timeout time on the basis of the ToS of an IP packet received from a terminal or a communication device.

Figure 4:
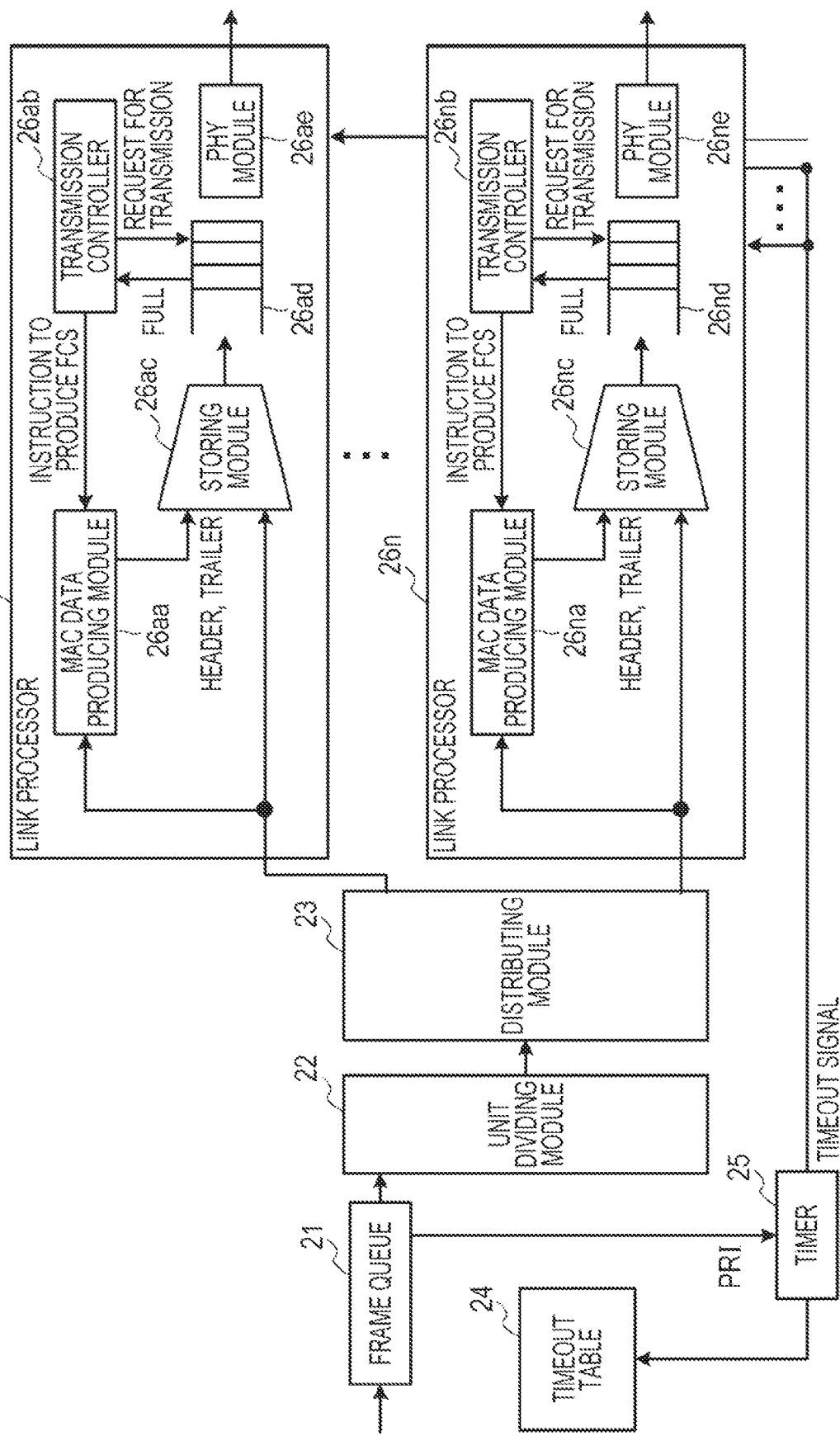
FIG. 4 is a block diagram illustrating the communication device.

FIG. 4 is a block diagram illustrating the communication device. As illustrated in FIG. 4, the communication device 11 has a frame queue 21, a unit dividing module 22, a distributing module 23, a timeout table 24, a timer 25 and link processors 26a-26n. Incidentally, the communication device 12 may have the blocks illustrated in FIG. 4. A frame to be transmitted to the communication device 12 is stored in the frame queue 21. The frame is, e.g., an Ethernet frame. The unit dividing module 22 divides the frame stored in the frame queue 21 into units of a specific size.

The distributing module 23 distributes the units of the frame divided by the unit dividing module 22 to the link processors 26a-26n. The distributing module 23 distributes the units to the link processors 26a, . . . , 26n, 26a, . . . by means of a round robin system. The distributing module 23 adds restoring data to the units so that the units into which the frame is divided by the unit dividing module 22 are restored to the former frame on the communication device 12. The distributing module 23 adds the restoring data, as described later, to the units into which the frame is divided starting the front one and as many as the link processors 26a-26n. Further, the distributing module 23 adds padding so that the numbers of the units are even for all the links 13a-13n. Further, if the last unit does not fill a specific size, the distributing module 23 adds padding so that the last unit fills the specific size.

Figure 5:
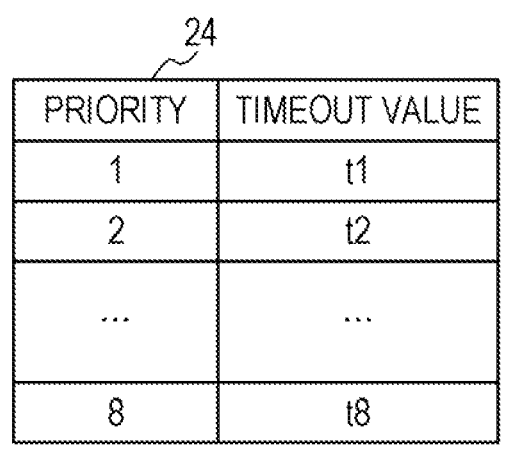

The frame priority is related to a timeout value, and the frame priority and the timeout value are stored in the timeout table 24. FIG. 5 illustrates an exemplary data structure of the timeout table. As illustrated in FIG. 5, the timeout table 24 has a priority column and a timeout value column. A value corresponding to the PRI of the VLAN tag of the frame is stored in the priority column. That is, the frame priority is stored in the priority column. A smaller value indicates a higher priority. A timeout value for measuring the timeout time is stored in the timeout value column. As the priority is higher, the timeout value is smaller. The timeout value is, e.g., a couple of microseconds to several hundred microseconds.

Return to the explanation of FIG. 4. The timer 25 obtains the PRI from the VLAN tag of the frame stored in the frame queue 21, and recognizes the priority of the frame stored in the frame queue 21. The timer 25 refers to the timeout table 24 on the basis of the recognized priority, and obtains the timeout value. The obtained timeout value is set to the timer 25, and the timer 25 measures the timeout time. Upon the timeout time passing, the timer 25 outputs a timeout signal to the link processors 26a-26n.

The timer 25 is reset when empty payloads of the link transfer frames are loaded with units first in the link processors 26a-26n. Then, the timer 25 obtains a priority of a frame of a unit first loaded onto the payloads from the frame queue 21. That is, the timeout time is not updated until the payloads of the link transfer frames are loaded with the units and transmitted to the links 13a-13n, and is updated if the link transfer frames are transmitted to the links 13a-13n.

The link processors 26a-26n are provided for the links 13a-13n, respectively. The link processors 26a and 26n are, e.g., provided for the links 13a and 13n, respectively. The link processor 26a has a MAC data producing module 26aa, a transmission controller 26ab, a storing module 26ac, a physical port queue 26ad and a PHY (PHYsical) module 26ae. The link processor 26n has a MAC data producing module 26na, a transmission controller 26nb, a storing module 26nc, a physical port queue 26nd and a PHY module 26ne. The link processors which are not illustrated have similar portions as the link processors 26a and 26n. Only the portions of the link processor 26a will be explained below.

The MAC data producing module 26aa produces a header and a trailer of a link transfer frame to be transmitted to the communication device 12, and outputs the header and the trailer to the storing module 26ac. The header is control data related to the link transfer frame provided to the front of the link transfer frame, and includes, e.g., a source MAC address, a destination MAC address and an Ethernet type. The trailer is control data provided to the rear of the link transfer frame, and includes an FCS which enables the communication device 12 to identify whether the link transfer frame is properly received by the communication device 12 which receives the link transfer frame. When the physical port queue 26ad turns empty, i.e., a link transfer frame produced by the physical port queue 26ad is transmitted to the link 13a, the MAC data producing module 26aa produces the header and outputs the header to the storing module 26ac. Further, upon receiving an FCS producing instruction from the transmission controller 26ab, the MAC data producing module 26aa produces the trailer and outputs the trailer to the storing module 26ac.

Upon being notified by the physical port queue 26ad that the payload of the link transfer frame becomes full (Full), the transmission controller 26ab outputs the FCS producing instruction to the MAC data producing module 26aa, and requests transmission so that the physical port queue 26*ad* transmits the link transfer frame. Further, if the timer 25 outputs a timeout signal, the transmission controller 26*ab* outputs the FCS producing instruction to the MAC data producing module 26*aa*, and requests transmission so that the physical port queue 26*ad* transmits the link transfer frame.

That is, if the transmission controller 26*ab* transmits the link transfer frame to the communication device 12 as the timeout time has passed the timeout value, the transmission controller 26*ab* adds a trailer to the link transfer frame of the physical port queue 26*ad* and requests transmission. Further, if the payload of the link transfer frame becomes full before the timeout time passes the timeout value and the link transfer frame is transmitted to the communication device 12, the transmission controller 26*ab* adds a trailer to the link transfer frame of the physical port queue 26*ad* and requests transmission.

The storing module 26*ac* stores the unit distributed by the distributing module 23 and the header and the trailer output by the MAC data producing module 26*aa* in the physical port queue 26*ad*.

The header and the trailer produced by the MAC data producing module 26*aa* are stored in the physical port queue 26*ad*. Further, a unit distributed by the distributing module 23 is stored in the physical port queue 26*ad*. The header produced by the MAC data producing module 26*aa*, then the unit distributed by the distributing module 23, and finally the trailer are stored in the physical port queue 26*ad*. The physical port queue 26*ad* thereby produces the link transfer frame of, e.g., an Ethernet frame to be transmitted to the communication device 12. If the payload of the link transfer frame becomes full of units, the physical port queue 26*ad* notifies the transmission controller 26*ab* of that fact. Further, upon receiving a transmission request from the transmission controller 26*ab*, the physical port queue 26*ad* outputs the link transfer frame assembled in the physical port queue 26*ad* to the PHY module 26*ae*.

The PHY module 26*ae* performs a physical layer process, e.g., of Ethernet and performs a process such as transmission line encoding. The PHY module 26*ae* outputs the link transfer frame provided by the physical port queue 26*ad* to the link 13*a*.

Figure 6:
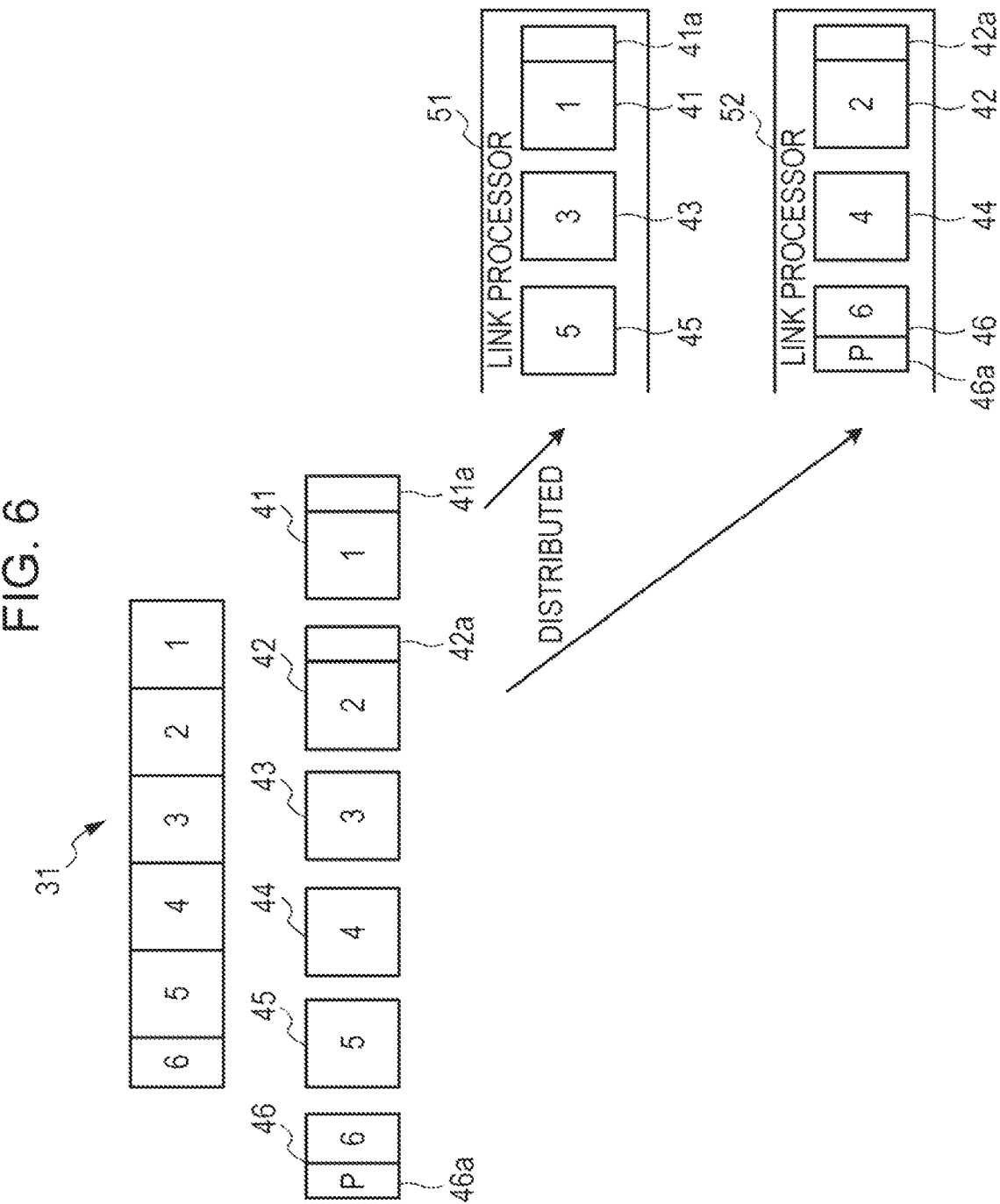
FIG. 6 illustrates division of a frame into units and a link transfer frame.

FIG. 6 illustrates division of a frame into units and a link transfer frame. FIG. 6 illustrates a frame 31 stored in the frame queue 21 illustrated in FIG. 4, units 41-46 into which the frame 31 is divided by the unit dividing module 22, and link processors 51 and 52. FIG. 6 illustrates a case in which the number of the link processors 26*a*-26*n* is two.

The unit dividing module 22 divides the frame 31 into units of a specific size. As illustrated in FIG. 6, e.g., the unit dividing module 22 divides the frame 31 into six units 41-46. Incidentally, the frame 31 may be indivisible by the specific size. As illustrated in FIG. 6, e.g., the unit 46 divided last from the frame 31 may be smaller in size than the other units 41-45 in some cases.

The distributing module 23 distributes the units 41-46 into which the frame 31 is divided by the unit dividing module 22 to the link processors 51 and 52 in turn. As illustrated in FIG. 6, e.g., the distributing module 23 distributes the unit 41 to the link processor 51, the unit 42 to the link processor 52, the unit 43 to the link processor 51, and similarly distributes the units 44-46 in turn.

The distributing module 23 adds restoring data to the units into which the frame is divided starting the front one and as many as the links. As illustrated in FIG. 6, e.g., as the number of the links is two, the distributing module 23 adds restoring data 41*a* and 42*a* to the units 41 and 42, the two units from the front of the frame 31, respectively.

Further, the distributing module 23 adds padding so that the numbers of the units are even on all the links. Further, if the last unit does not fill the specific size, the distributing module 23 adds padding so that the last unit fills the specific size. As illustrated in FIG. 6, e.g., as the last unit 46 does not fill the specific size, the distributing module 23 adds padding (indicated by "P" in FIG. 6) 46*a* so that the last unit 46 fills the specific size. As illustrated in FIG. 6, e.g., the numbers of the units on the two links (link processors 51 and 52) are evenly three. If the unit 46 is not present (the frame 31 is divisible by the units 41-45), the numbers of the units of the link processing units 51 and 52 are three and two, respectively, being uneven between the two links. In this case, the distributing module 23 adds the padding to the link transfer frame so that the numbers of the units are even on the two links, and makes the numbers of the units on the two links evenly three. In FIG. 6, a portion in the unit 46 in the link processor 52 is made full of the padding.

The restoring data 41*a*, 42*a* includes an identifier for identifying the restoring data 41*a*, 42*a*, a sequence number indicating an order of distributing the units 41-46 to the link processing units 51, 52, and length data indicating a length of the frame 31.

The identifier is a code such as "0x7e". Thus, it is expected that the code "0x7e" will be added to the front of a payload of the link transfer frame as long as it is not a unit continued from a frame previously transmitted. The communication device 12 may thereby recognize the front of the frame.

The sequence number is a number for indicating the order of distributing the units 41-46. As the unit 41, e.g., is distributed first to the link processing unit 51, a number "1" is added to the sequence number of the restoring data 41*a*. As the unit 42 is distributed second to the link processing unit 52, a number "2" is added to the sequence number of the restoring data 42*a*. The communication device 12 thereby compares the received sequence numbers between ports for which link aggregations are assembled. Upon assembling the units received in order of the sequence numbers, the communication device 12 may restore the frame 31.

The length data indicates the length of the frame 31. The communication device 12 may thereby recognize the last of the frame by means of the received length data. If there is a remainder, data more than the length data, the communication device 12 may identify the remainder as padding and abandon the padding.

Incidentally, as an FCS is added to the frame 31, the communication device 12 may check whether the assembled frame 31 has been correctly restored to the former frame on the basis of the FCS.

Figure 7:
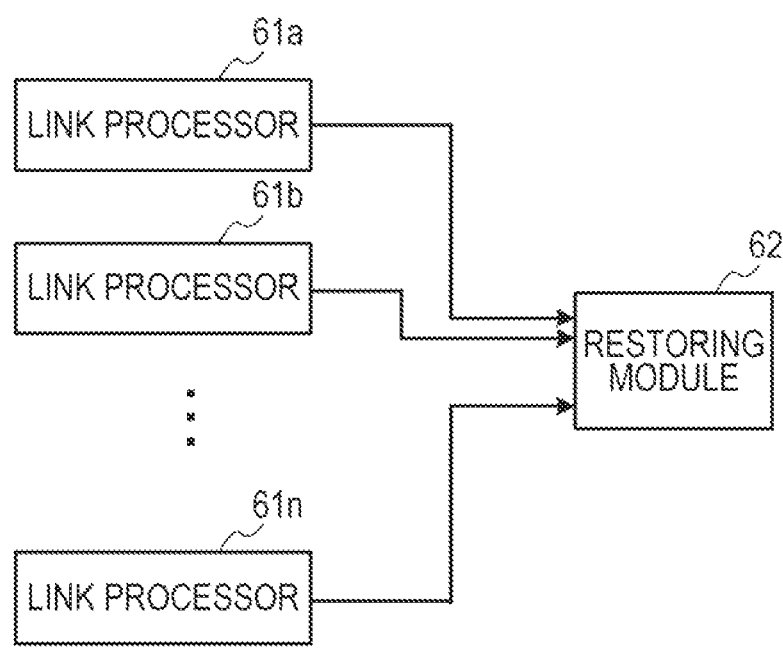
FIG. 7 is a block diagram illustrating a communication device on a receiving side.

FIG. 7 is a block diagram illustrating the communication device on the receiving side. As illustrated in FIG. 7, the communication device 12 has link processors 61*a*-61*n* and a restoring module 62.

The link processors 61*a*-61*n* are provided for the links 13*a*-13*n*, respectively. Each of the link processors 61*a*-61*n* has a PHY processor and a MAC processor, and receives the link transfer frame sent from the communication device 11 by means of an SFP (Small Form factor Pluggable) if the links 13*a*-13*n* is in an optical fiber. The link processors 61*a*-61*n* check whether the frame has been correctly sent by means of the FCS of the received link transfer frames. The link processors 61*a*-61*n* extract the payloads of the received link transfer frames, and output the payloads to the restoring module 62.

The restoring module 62 recognizes the restoring data added to the unit on the basis of the code "0x7e" of the unit included in the payload, and recognizes the front of the frame to be restored. Further, the restoring module 62 recognizes the order in which the units are distributed among the ports (links 13a-13n) from the sequence number included in the restoring data, and combines the units in the recognized order. Further, the restoring module 62 recognizes the padding added to the unit from the length included in the restoring data and abandons the padding. The restoring module 62 identifies whether the restored frame has been correctly restored on the basis of the FCS of the restored frame.

Figure 8:
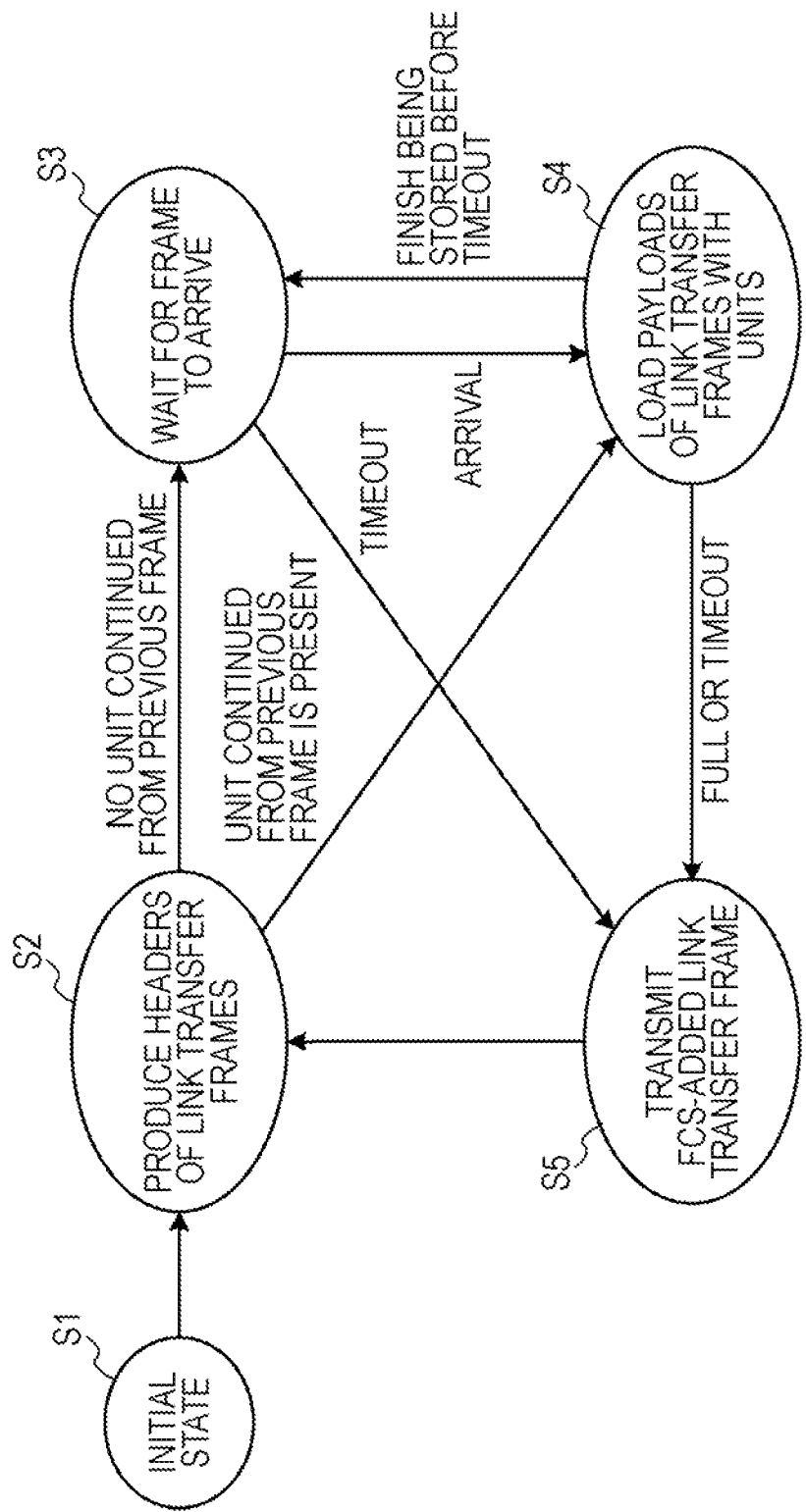
FIG. 8 is a state transition diagram illustrating transmission operation of the communication device.

FIG. 8 is a state transition diagram illustrating the transmission operation of the communication device.

State S1: A state S1 indicates, e.g., a state just after the communication device 11 is powered on. In the state S1, the physical port queues 26ad-26nd are being empty. After an initial setting process finishes, the communication device 11 shifts to a state S2.

State S2: In the state S2, the MAC data producing modules 26aa-26na produce headers of the link transfer frames. The produced headers of the link transfer frames are stored by the storing modules 26ac-26nc in the physical port queues 26ad-26nd, respectively.

In the state S2, if there is no unit continued from a frame transmitted on the previous link transfer frame, the communication device 11 shifts to a state S3. In the state S2, if there is a unit continued from the frame transmitted on the previous link transfer frame, the communication device 11 shifts to a state S4. If, e.g., the payload of the previously transmitted link transfer frame becomes full before all the units of the frame are included in the payload, the communication device 11 shifts to the state S4.

State S3: In the state S3, the communication device 11 waits for a frame to be stored in the frame queue 21. That is, the communication device 11 waits for a frame to arrive from a terminal or anther communication device. In the state S3, if a frame arrives from a terminal or another communication device, the communication device 11 shifts to the state S4. In the state S3, if no frame arrives from a terminal or another communication device before the timeout, the communication device 11 shifts to a state S5.

State S4: In the state S4, the unit dividing module 22 divides the frame into units, and the distributing module 23 distributes the units to the link processors 26a-26n. That is, the units are stored in the physical port queues 26ad-26nd.

If the units are stored in the physical port queues 26ad-26nd first in a state in which only the headers of the link transfer frames are stored in the physical port queues 26ad-26nd, the timer 25 is reset and set a timeout value obtained from the timeout table 24.

If the units finish being included in the payload before the timeout time passes the timeout value in the state S4, the communication device 11 shifts to the state S3. If the timeout time passes or the payload become full of the included units in the state S4, the communication device 11 shifts to the state S5.

State S5: In the state S5, the communication device 11 adds an FCS to the link transfer frame, and transmits the link transfer frame to the communication device 12. Upon having shifted to the state S5 after the timeout time passed, the communication device 11 adds the FCS after the numbers of the respective links 13a-13n become even. Upon finishing the transmission of the link transfer frame, the communication device 11 shifts to the state S2.

As described above, the communication device 11 divides a frame into units of a specific size, and distributes the units to a plurality of links. The communication device 11 includes the units in payloads of link transfer frames to be transmitted to the communication device 12. If the units included in the payloads of the link transfer frames reach a specific size, or if a timeout time based on the priority of the frame passes the timeout value, the communication device 11 transmits the link transfer frames to the communication device 12. Transfer efficiency of the transfer frame may thereby be properly enhanced, and the delay of the transfer frame may be properly prevented.

Third Embodiment

Then, a third embodiment will be explained in detail with reference to the drawings as follows. According to a link aggregation system, the number of links may be increased or decreased in such a way that the number of ports to be used is decreased as a link failure occurs or the number of links is increased as a shortage of communication capacity occurs. Thus, a communication device of the third embodiment increases or decreases the number of the links, which will be explained as follows.

Although the communication device 11 of the third embodiment is illustrated by a same block diagram as FIG. 4, the distributing module 23 and the link processors 26a-26n operate in different ways. The block diagram illustrated in FIG. 4 will be used below so that an operation of the communication device 11 for increasing or decreasing the number of the links will be explained. Incidentally, the communication device 11 is assumed to be connected to a terminal operated by a user (an operator).

Figure 9:
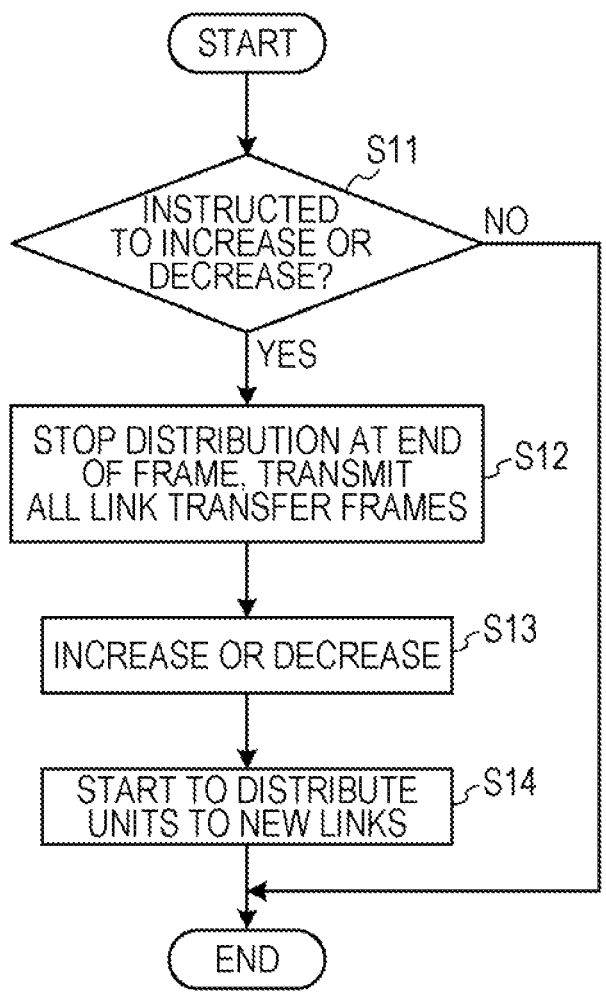
FIG. 9 is a flowchart illustrating operation of the communication device for increasing or decreasing the number of links.

FIG. 9 is a flowchart for illustrating the operation of the communication device for increasing or decreasing the number of the links.

Step S11: The distributing module 23 identifies whether the distributing module 23 is instructed by the user-operated terminal to increase or decrease the number of the links 13a-13n. Upon being instructed to increase or decrease the number of the links, the distributing module 23 shifts to a step S12. Unless the distributing module 23 is instructed to increase or decrease the number of the links, the distributing module 23 ends the process for increasing or decreasing the number of the links, and performs a regular process.

Step S12: The distributing module 23 stops distributing the units at an end (trailer) of the frame. That is, after all the units of one frame are distributed to the link processors 26a-26n, the distributing module 23 stops distributing the units. The distributing module 23 adds padding as necessary. The transmission controllers 26ab-26nb of the link processors 26a-26n control to transmit the link transfer frames stored in the physical port queues 26ad-26nd to the links 13a-13n.

Step S13: Increase or decrease the number of the links 13a-13n.

Step S14: The distributing module 23 starts to distribute the units to new links 13a-13n (new link processors 26a-26n). At this time, the MAC data producing modules 26aa-26na outputs the headers of the link transfer frames to the physical port queues 26ad-26nd.

As described above, upon being instructed to increase or decrease the number of the links by the operator, the distributing module 23 stops distributing the units at the end of the frame. The number of the links may thereby be increased or decreased.

Fourth Embodiment

Then, a fourth embodiment will be explained in detail with reference to the drawings as follows. According to the second embodiment, if link transfer frames are transmitted to the links, the timeout time is updated. According to the fourth embodiment, when units of a new frame are distributed to a plurality of links, a timeout value (timeout time) based on the priority of the new frame and the timeout time being measured at present are compared with each other. If the new timeout time (the timeout value based on the priority of the new frame) is shorter than the timeout time being measured at present, the new timeout time is measured.

Figure 10:
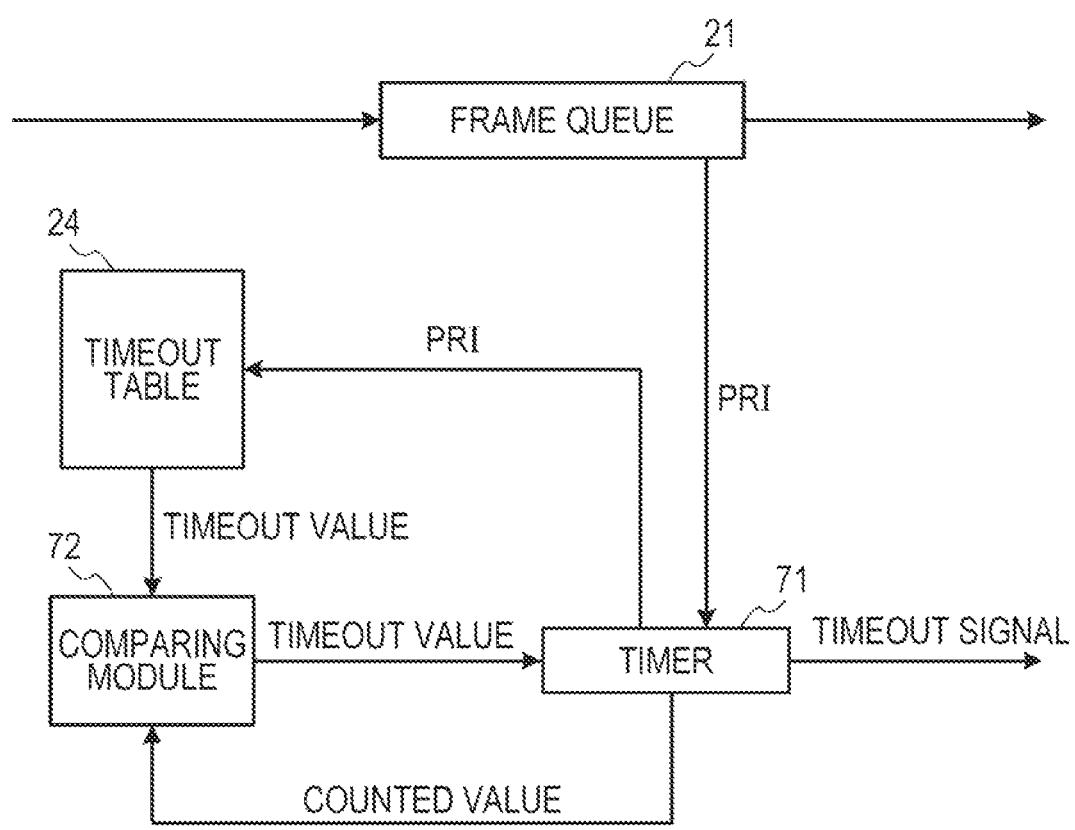
FIG. 10 is a block diagram illustrating a communication device of a fourth embodiment.

FIG. 10 is a block diagram illustrating a communication device of the fourth embodiment. As illustrated in FIG. 10, the communication device 11 has a timer 71 and a comparing module 72. The frame queue 21 and the timeout table 24 illustrated in FIG. 4 are also illustrated in FIG. 10. Incidentally, the other blocks of the communication device 11 which are not illustrated in FIG. 10 are same as the corresponding ones illustrated in FIG. 4, and their explanations are omitted.

When units of a new frame are distributed to the link processors 26a-26n, the timer 71 obtains a PRI of the new frame even if no link transfer frames are transmitted to the links 13a-13n. The timer 71 outputs the obtained PRI to the timeout table 24. Further, upon obtaining the PRI, the timer 71 outputs to the comparing module 72 a value counted downwards from the timeout value by the timer 71.

The timeout table 24 outputs to the comparing module 72 a timeout value corresponding to the PRI output from the timer 71.

The comparing module 72 compares the timeout value output from the timeout table 24 and the counted value of the timer output from the timer 71. That is, the comparing module 72 compares remaining time of the timeout time being measured at present and the timeout time (timeout value) of the new frame. If the timeout value output from the timeout table 24 is smaller than the counted value output from the timer 71, the comparing module 72 outputs to the timer 71 the timeout value output from the timeout table 24.

If the comparing module 72 outputs the timeout value, the timer 71 sets the timeout value thereto and measures the timeout time. That is, if the timeout time due to the new frame is shorter than the remaining time of the timeout time being measured at present, the timer 71 measures the timeout time due to the new frame.

When units of a new frame are distributed to the links 13a-13n, as described above, the communication device 11 obtains the priority of the new frame and obtains a timeout value corresponding to the priority. Then, the communication device 11 compares remaining time of the timeout time being measured at present and the newly obtained timeout time (timeout value). If the new timeout time is shorter, the communication device 11 measures the new timeout time. Upon receiving a frame of a high priority, the communication device 11 may thereby prevent a frame delay by reflecting the priority.

Fifth Embodiment

Then, a fifth embodiment will be explained in detail with reference to the drawings. The fifth embodiment will be explained in a case where a communication device has a plurality of link aggregations.

Figure 11:
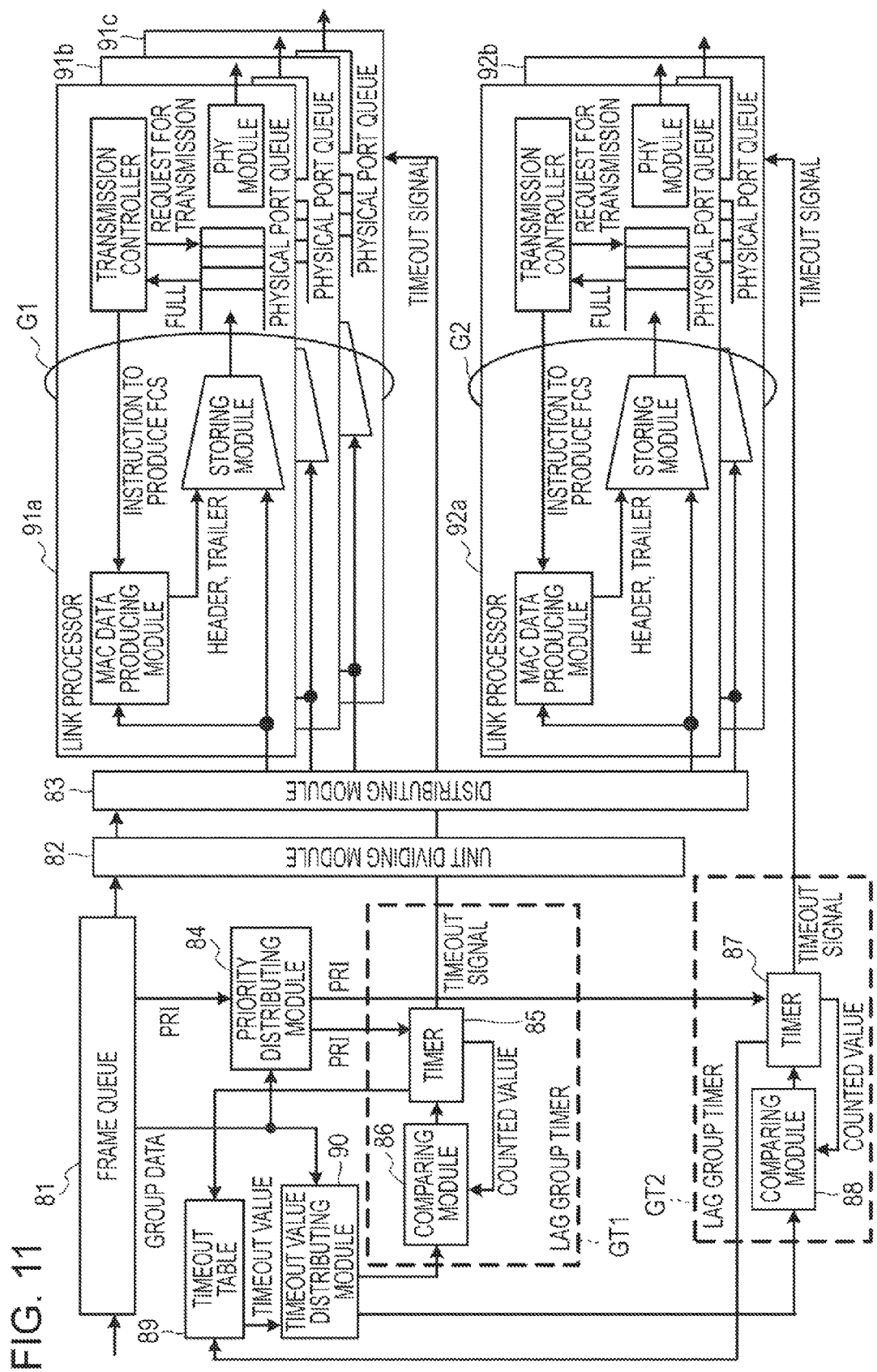
FIG. 11 is a block diagram illustrating a communication device of a fifth embodiment.
Figure 12:
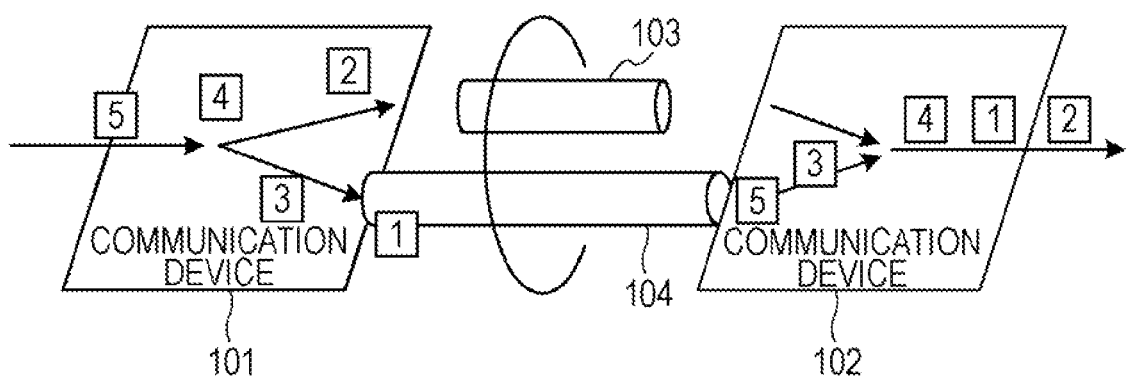
FIG. 12 illustrates a changed order of frames in a link aggregation system.
Figure 13:
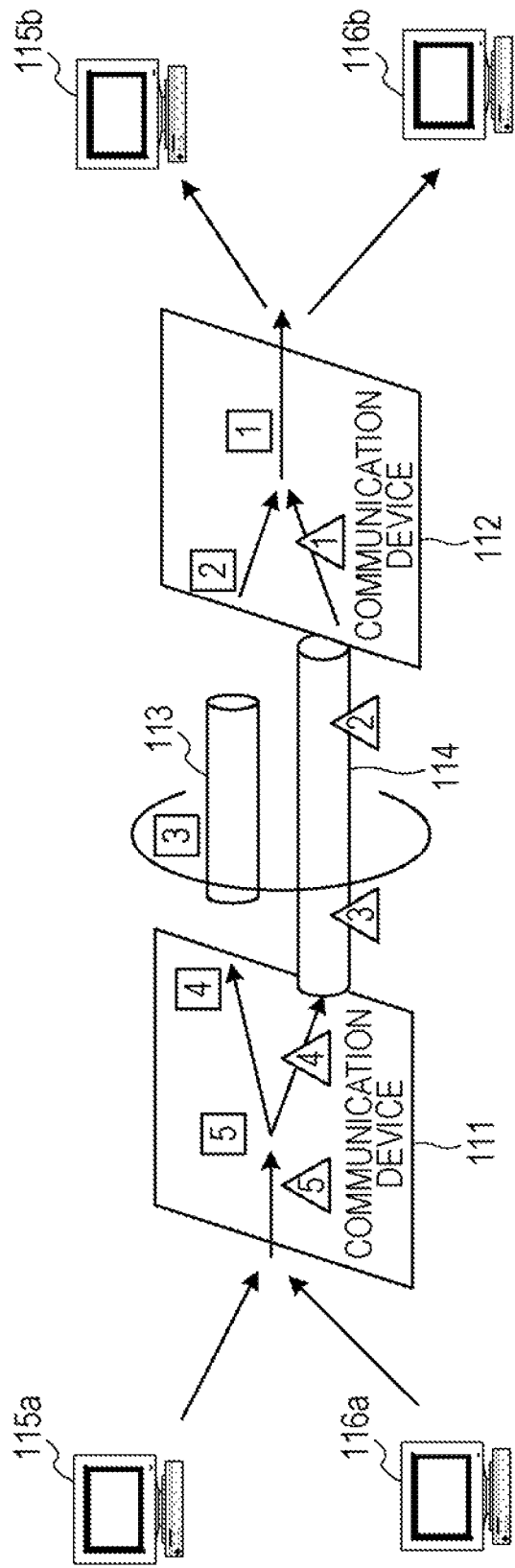
FIG. 13 is a diagram for explaining a conversation.
Figure 14:
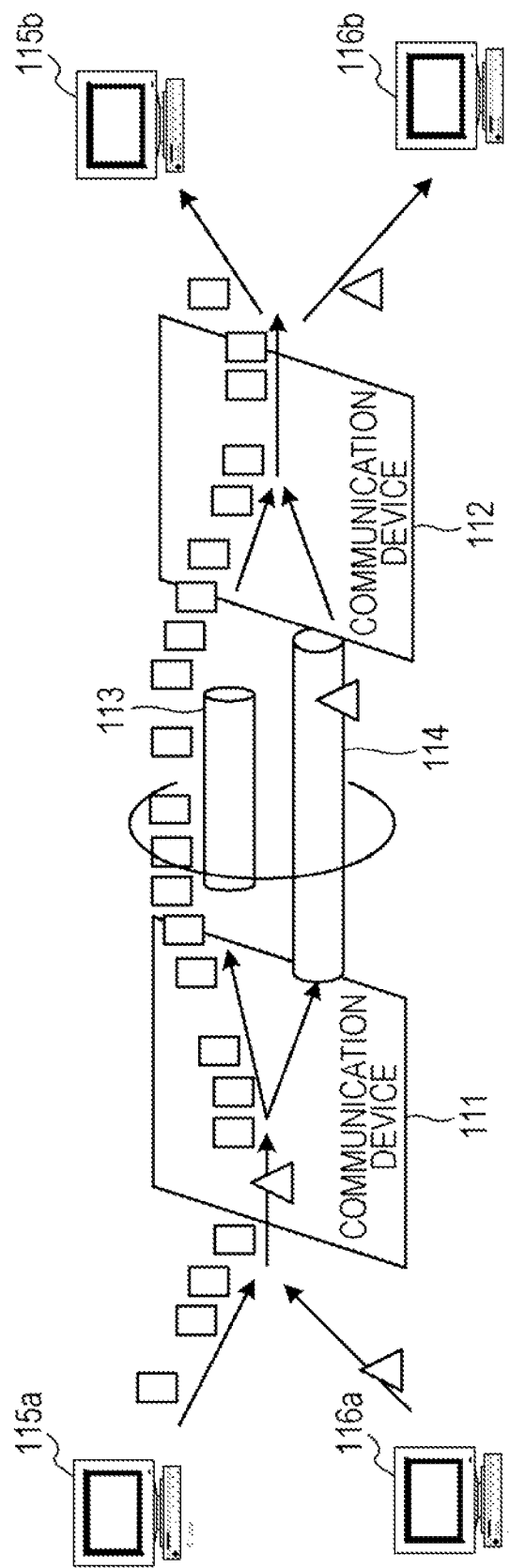
FIG. 14 illustrates an imbalance in the communication bandwidth.
Figure 15:
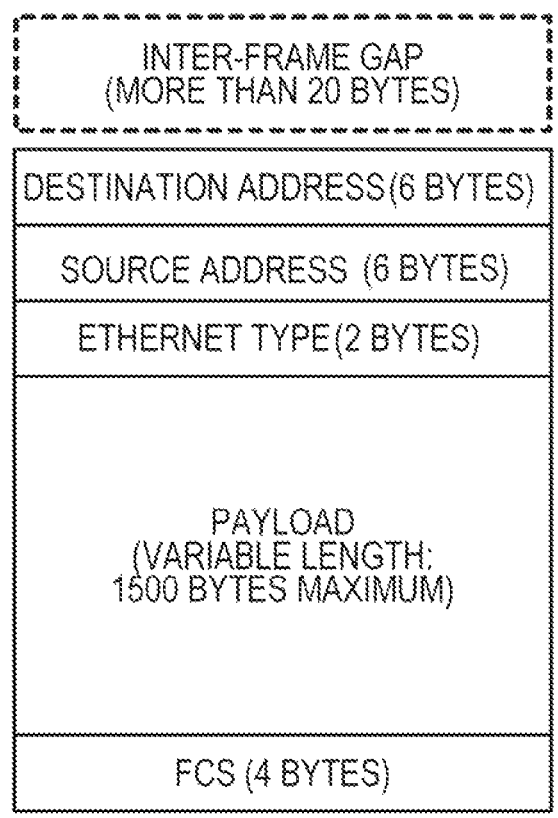
FIG. 15 illustrates an exemplary frame format of an Ethernet frame.

FIG. 11 is a block diagram illustrating a communication device of the fifth embodiment. As illustrated in FIG. 11, the communication device 11 has a frame queue 81, a unit dividing module 82, a distributing module 83, a priority distributing module 84, a timeout table 89, a timeout value distributing module 90, LAG (Link Aggregation Group) group timers GT1, GT2, and LAG groups G1, G2.

The communication device 11 has two link aggregation groups. The LAG groups G1 and G2 have link processors 91a-91c and link processors 92a and 92b, respectively. Each of the link processors 91a-91c, 92a and 92b has same blocks as the link processor 26a explained with reference to FIG. 4, and their explanations are omitted.

Link aggregations are grouped, e.g., for respective customers. The LAG groups G1 and G2 are assigned, e.g., to customers A and B, respectively. The customers A and B are thereby assigned three and two links, respectively, so as to perform communication.

The communication device 11 has the LAG group timers GT1, GT2 for the LAG groups G1, G2, respectively. The LAG group timer GT1 has a timer 85 and a comparing module 86. The LAG group timer GT2 has a timer 87 and a comparing module 88.

The LAG group timers GT1, GT2 measure timeout times for the LAG groups G1, G2, respectively. Thus, if the LAG group timer GT1 outputs a timeout signal, the link processors 91a-91c of the LAG group G1 transmit link transfer frames stored in the physical port queues to the links. If the LAG group timer GT2 outputs a timeout signal, the link processors 92a, 92b of the LAG group G2 transmit link transfer frames stored in the physical port queues to the links.

A frame to be transmitted to the communication device 12 is stored in the frame queue 81. The unit dividing module 82 divides the frame stored in the frame queue 81 into units of a specific size.

The distributing module 83 distributes the units into which the frame is divided by the unit dividing module 82 to the LAG groups G1, G2 on the basis of group data included in the frame. The distributing module 83 recognizes whether the units are addressed to the customer A or to the customer B, e.g., owing to a destination address of the frame, and distributes the units to the LAG groups G1, G2. The distributing module 83 may distribute the units to the LAG groups G1, G2 owing to the VLAN ID.

The distributing module 83 further distributes the units distributed to the LAG group G1 to the link processors 91a-91c in turn, and further distributes the units distributed to the LAG group G2 to the link processors 92a, 92b in turn.

The priority distributing module 84 obtains the PRI of the frame of the units distributed to the LAG groups G1, G2, and distributes the obtained PRI to the LAG group times GT1, GT2 on the basis of the group data included in the frame. If, e.g., the frame of the obtained PRI is addressed to the customer A, the priority distributing module 84 outputs the obtained PRI to the LAG group timer GT1. If the frame of the obtained PRI is addressed to the customer B, the priority distributing module 84 outputs the obtained PRI to the LAG group timer GT2.

The timer 85 outputs to the timeout table 89 the PRI distributed by the priority distributing module 84. Further, if the priority distributing module 84 outputs the PRI, the timer 85 outputs to the comparing module 86 a value counted downwards from the timeout value.

The comparing module 86 compares the timeout value output from the timeout table 89 and the counted value output from the timer 85. If the timeout value output from the timeout table 89 is smaller than the counted value output from the timer 85, the comparing module 86 outputs to the timer 85 the timeout value output from the timeout table 89.

If the comparing module 86 outputs the timeout value, the timer 85 sets the timeout value thereto. The timer 87 and the comparing module 88 of the LAG group timer GT2 are same as the timer 85 and the comparing module 86 of the LAG group timer GT1, respectively, and their explanations are omitted.

The timeout table 89 outputs to the timeout value distributing module 90 a timeout value corresponding to the PRI output from the timers 85, 87.

The timeout value distributing module 90 outputs and distributes to the comparing units 86, 88 the timeout value corresponding to the PRI output from the timeout table 89 on the basis of the group data included in the frame of the units distributed to the LAG groups G1, G2. If, e.g., the frame of the units distributed to the LAG groups G1, G2 is addressed to the customer A, the timeout value distributing module 90 outputs the timeout value to the comparing module 86 of the LAG group timer GT1. Further, if the frame of the units distributed to the LAG groups G1, G2 is addressed to the customer B, the timeout value distributing module 90 outputs the timeout value to the comparing module 88 of the LAG group timer GT2.

As described above, the communication device 11 distributed the units to the LAG groups G1, G2 having the plural links, and further, distributes the units to the plural links in the LAG groups G1, G2. Even if plural links are grouped, transfer efficiency of the link transfer frames may thereby be properly enhanced, and the delay of the link transfer frames may be properly prevented.

Incidentally, the comparing modules 86, 88 may be omitted in FIG. 11. In this case, if the LAG groups G1, G2 output the link transfer frames, the timers 85, 87 update the timeout time.

As disclosed above, the communication device may properly enhance transfer efficiency of a transfer frame and may prevent a delay of the transfer frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication device performing communication by breaking up a frame into a plurality of links, the communication device comprising:
    a dividing module to divide the frame into units of a predetermined size;
    a distributing module to distribute the units to a plurality of links;
    a plurality of storing modules to store the units distributed by the distributing module in payloads of transfer frames for the respective plurality of links;
    a timer to measure a time interval, the time interval being variable and being based on a priority value located within the frame; and
    a transmission controller to trigger transmission of the transfer frames to another communication device via the plurality of links in one of a case where a number of the units included in the payloads of the transfer frames becomes a predetermined amount and a case where the time interval measured by the timer becomes a predetermined value,
    wherein the distributing module stops distributing the units at an end of the frame in a case of being instructed to increase or decrease a number of the links by an operator, so that the communication device is operable to increase or decrease the number of the links as a shortage of communication capacity occurs or a link failure occurs, respectively.

2. The communication device according to claim 1, wherein the distributing module adds restoring data to the units into which the frame is divided so that the units are restored to a former frame on another communication device, the restoring data being added to the units on a front position of each link as many as the plurality of links.

3. The communication device according to claim 2, wherein the restoring data includes an identifier for identifying the restoring data, a sequence number indicating an order of distributing the units, and length data indicating a length of the frame.

4. The communication device according to claim 1, wherein the distributing module adds padding data so that the numbers of the units are even for all the links.

5. The communication device according to claim 1, in a case where a last divided unit does not fill the predetermined size, the distributing module adds padding data so that the last unit fills the predetermined size.

6. The communication device according to claim 1, wherein the timer updates the time interval when the transfer frames are transmitted to another communication device.

7. The communication device according to claim 1, further comprising:
    a comparing module to compare a time interval associated with a new frame and a remaining portion of the time interval being measured at present,
    wherein the timer measures the time interval associated with the new frame in a case where the time interval associated with the new frame is shorter than the remaining portion.

8. The communication device according to claim 1, wherein the distributing module distributes the units into groups, each group having a plurality of links, and distributes the units to the plurality of links in each group.

9. The communication device according to claim 8, wherein the timer measures the time interval in each group.

10. The communication device according to claim 1, wherein the frame is an Ethernet frame and the priority value is located within the VLAN tag of the Ethernet frame.

11. A communication device performing communication by breaking up a frame into a plurality of links, the communication device comprising:
    a memory for storing the frame; and
    a processor executing an operation, the operation comprising:
        dividing the frame into units of a predetermined size;
        distributing the units to a plurality of links;
        storing the distributed units in payloads of transfer frames for the respective plurality of links;
        measuring a time interval, the time interval being variable and being based on a priority value located within the frame; and
        triggering transmission of the transfer frames to another communication device via the plurality of links in one of a case where a number of the units included in the payloads of the transfer frames becomes a predetermined amount and a case where the time interval measured by timer becomes a predetermined value,
    wherein said distributing is stopped at an end of the frame in a case of being instructed to increase or decrease a number of the links by an operator, so that the communication device is operable to increase or decrease the number of the links as a shortage of communication capacity occurs or a link failure occurs, respectively.

12. The communication device according to claim 11, wherein the frame is an Ethernet frame and the priority value is located within the VLAN tag of the Ethernet frame.

13. A communication method of a communication device performing communication by breaking up a frame into a plurality of links, the communication method comprising:
  dividing the frame into units of a predetermined size;
  distributing the units to a plurality of links;
  storing the distributed units in payloads of transfer frames for the respective plurality of links;
  measuring a time interval, the time interval being variable and being based on a priority value located within the frame; and
  triggering transmission of the transfer frames to another communication device via the plurality of links in one of a case where a number of the units included in the payloads of the transfer frames becomes a predetermined amount and a case where the time interval measured by timer becomes a predetermined value,
  wherein said distributing is stopped at an end of the frame in a case of being instructed to increase or decrease a number of the links by an operator, so that the communication device is operable to increase or decrease the number of the links as a shortage of communication capacity occurs or a link failure occurs, respectively.

14. The communication method according to claim 13, wherein the frame is an Ethernet frame and the priority value is located within the VLAN tag of the Ethernet frame.

\* \* \* \* \*